United States Patent [19]

Uhlmann et al.

[11] 4,367,170

[45] Jan. 4, 1983

[54] STABILIZED PHOTOCHROMIC MATERIALS

[75] Inventors: Donald R. Uhlmann, Newton; Elias Snitzer, Wellesley; Richard J. Hovey, Sturbridge; Nori Y. C. Chu, Southbridge, all of Mass.

[73] Assignee: American Optical Corporation, Southbridge, Mass.

[21] Appl. No.: 543,711

[22] Filed: Jan. 24, 1975

[51] Int. Cl.$^3$ .............................................. G02B 5/23

[52] U.S. Cl. ............................ 252/586; 106/DIG. 6; 252/316; 252/385; 350/354; 428/403; 428/404; 428/406; 428/913; 427/222

[58] Field of Search ............... 252/316, 385, 586, 600; 96/90 PE; 428/308, 913, 312.6, 403, 404, 406; 106/DIG. 6; 204/192; 350/354; 427/222

[56] References Cited

U.S. PATENT DOCUMENTS

| | | | |
|---|---|---|---|
| 1,833,640 | 11/1931 | Fruth | 204/192 |
| 2,649,382 | 8/1953 | Vesce | 106/193 |
| 3,179,600 | 4/1965 | Brockett | 252/316 X |
| 3,190,837 | 6/1965 | Brynko et al. | 252/316 |
| 3,362,846 | 1/1968 | Lee et al. | 427/215 |
| 3,390,933 | 7/1968 | Hovey et al. | 252/316 X |
| 3,488,290 | 1/1970 | Gerhardt et al. | 252/300 |

FOREIGN PATENT DOCUMENTS

| | | | |
|---|---|---|---|
| 649852 | 10/1962 | Canada | 252/300 |

OTHER PUBLICATIONS

Flinn et al.: "What is Happening in Microencapsulation", Chemical Engineering, Dec. 4, 1967, pp. 171–178.

*Primary Examiner*—Richard D. Lovering
*Attorney, Agent, or Firm*—Kenway and Jenney

[57] ABSTRACT

Organic photochromic materials comprising a photochromic dye and a resinous material can be stabilized with a protective coating which will protect them from deactivation by exposure to moisture, oxygen, various plastic host materials, reactive chemicals or even normal atmospheric conditions. Useful organic photochromic dyes include the spiropyrans, the spirooxazines, the metal dithizonates, the phenazines, the phenothiazines and other known photochromic compositions. Useful resinous materials include vinyl-type thermoplastics, cellulosic materials, polyesters, epoxy resins and aminoplast resins. The encapsulated photochromic materials of the invention comprise an organic photochromic dye in combination with an organic resinous material enclosed within an outer shell of an inorganic material and find use in the preparation of photochromic plastic films, sheets, ophthalmic lenses such as lenses for sunglasses and in camera lenses and filters.

12 Claims, No Drawings

STABILIZED PHOTOCHROMIC MATERIALS

BACKGROUND OF THE INVENTION

1. Field of the Invention

The instant invention is in the field of photochromic compositions. It is more particularly directed to particulate photochromic materials comprising photochromic dyes and resinous materials coated with inorganic materials.

2. Prior Art

It is known to combine a photochromic material and a resinous material, for instance, U.S. Pat. No. 3,761,422 relates to the preparation of a photochromic plastisol composition containing metal complexes of diphenylthiocarbazone which can be formed into a film. U.S. Pat. No. 3,565,814 relates to a photochromic composition having a fast rate of color change comprising a polymer of lauryl methacrylate having dispersed throughout the body thereof various benzospiropyran compounds. U.S. Pat. No. 3,666,352 relates to a photochromic lens comprising a sheet of vinyl chloride-vinyl acetate copolymer containing a mercury dithiozonate compound laminated between glass or plastic layers.

The need for protection of photochromic materials against atmospheric oxygen has also been recognized by the prior art as a means of insuring fast action and longer reversibility, for instance, U.S. Pat. No. 3,716,489 discloses a method of producing a fast-acting photochromic filter in which the photochromic material is in the form of a solid solution in a solid optically transparent epoxy polymer or alternately a polycarbonate polymer matrix.

SUMMARY OF THE INVENTION

It is an object of the invention to provide an encapsulated photochromic particulate material comprising a photochromic dye in admixture with a resinous material protected by an inorganic material outer shell which can be easily introduced into various plastic materials useful in the preparation of ophthalmic and other optical devices to provide a photochromic system having phototropic characteristics comprising more efficient and longer lasting reversible change in color to provide varying degrees of light transmission as a result of exposure to light.

It is a further object of the invention to provide a method of forming an encapsulated photochromic particulate material having an inorganic outer coating which protects the photochromic material from the adverse effects of monomers and catalysts used in the formation of synthetic plastic materials, and of oxygen, moisture or other changes in atmospheric conditions which adversely affect the desired behavior of the photochromic material when used in an ophthalmic or optical device.

The invention comprises a coated photochromic particle whose dimensions are about 30 Å to about 1μ. A protective coating of an inorganic material is utilized on the surface of the photochromic particle. The coating thickness is any effective thickness suitable to prevent diffusion from within the coating and to prevent absorption through the coating by the photochromic material of reactive chemicals, oxygen, moisture and other atmospheric contaminants which would reduce the fast-acting and reversible properties of the photochromic material. Desirable coating materials for protection of the photochromic material particle consist of inorganic glasses, crystalline inorganic oxides, non-oxide materials and mixtures thereof. Particularly preferred coating materials are such inorganic materials as zinc oxide, titanium dioxide, aluminum oxide, antimony oxide and silicon dioxide.

DESCRIPTION OF THE PREFERRED EMBODIMENTS

The process of the invention relates to the use of any photochromic material particle which is suitable for encapsulation with a protective inorganic thin film by procedures such as any of the following:

A combination of photochromic dye and resinous material is obtained by any suitable method such as by imbibing a photochromic dye into a resinous material. Generally, a resinous material is treated with a solution of a photochromic dye wherein the solvent utilized is either a non-solvent or is only a partial solvent for the resinous material. Preferably, the resinous material is treated as above subsequent to processing to obtain particles of the resin in finely divided form. Methods for producing finely divided particles of resinous materials are known to the art and utilize such devices as attrition, colloid and fluid energy mills. Useful resinous materials are exemplified by but are not limited to the following: Polyvinyl acetate, polystyrene, polyvinyl butyral, polyvinyl pyrrolidone, polycarbonate such as the material sold under the trademark "Lexan", polymethylmethacrylate such as the material sold under the trademark "Plexiglass", polyester resins, aminoplast resins, cellulosics such as cellulose acetate, cellulose acetate butyrate, nitrocellulose, epoxy resins and the like. As examples of suitable photochromic dyes, the spiropyrans, spirooxazines phenozines, phenothiazines and the metal dithizonates will be described with particularity as illustrative classes of photochromic dyes suitable for use in the process of the invention.

The metal dithizonates contemplated for use in the process are well known in the prior art. These are illustrated by the mercury dithizonates having the general formulas:

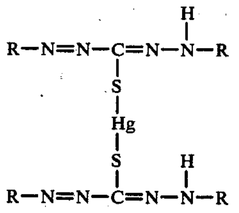

I

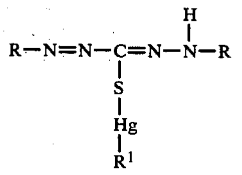

II wherein R is aryl, $R^1$ is halogen, aryl, alkyl or any combination thereof. The compounds can be made, for example, as described by Wobling and Steiger, Z. angew. Chem 46, 279 (1933). Especially useful mercury dithiozonates are mercury bis(diphenylthiocarbazonate), diphenylthiocarbazonomercuric chloride, fluoride, iodide or bromide, dinaphthylthiocarbazonomercuric chloride, fluoride, iodide or bromide, ditolylthiocarbazonomercuric chloride, fluoride, mercury bis(dinaphthylthiocarbazonate), mercury bis(ditolylthiocarbazonate), ethylmercuric diphenylthiocarbazonate and phenylmercuric diphenylthiocarbazonate.

Spiropyran photochromic materials are useful in the invention. The benzospiropyran photochromic dyes useful in the invention are well-known in the prior art and have the general formula

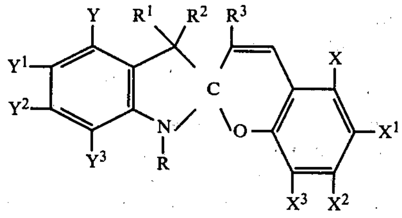

III wherein the substituents are as defined below.

These compounds are well known in the art as are methods for their preparation. For example, U.S. Pat. Nos. 2,953,454 and 3,022,318 teach various compounds and methods for their preparation. Useful benzospiropyrans are:

6-nitro-8-methoxy-1′,3′,3′-trimethylspiro[2H-1-benzopyran-2,-2′-indoline]
6-nitro-8-methoxy-5′-chloro-1′,3′,3′-trimethylspiro[2H-1-benzopyran-2,2′-indoline]
6-nitro-8-methoxy-5-bromo-1′,3′,3′-trimethylspiro[2H-1-benzopyran-2,2′-indoline]
6-nitro-8-methoxy-5-bromo-5′-chloro-1′,3′,3′-trimethylspiro[2H-1-benzopyran-2-2′-indoline]
6,5′-dinitro-8-methoxy-1′,3′,3′-trimethylspiro[2H-1-benzopyran-2,2′-indoline]
6-nitro,8-ethoxy-1′,3′,3′-trimethylspiro[2H-1-benzopyran-2,2′-indoline]

Other spiropyrans useful in the invention are derivatives of the following classes of compounds:

spiro[2H-1-benzopyran-2,2′-[1H]-benzo[g]indoline]
spiro[2H-benzopyran-2,2′-[1H]-benzo[e]indoline]
spiro[indoline-2,3′-[3H]-naphtho[2,1-b]pyran]
spiro[2H-1-benzopyran-2,2′-benzothiazolines]
spiro[benzothiazoline-2,3′-[3H]-naphtho[2,1-b]pyran]
2,2′-spirobi[2H-1-benzopyran]
3,3′-spirobi[3H-naphtho[2,1-b]pyran]
2,2′-spirobi[2H-naphtho[1,2-b]pyran]
spiro[2H-1-benzopyran-2,3′-[3H]-naphtho[2,1-b]pyran]
spiro[2H-1-benzopyran-2,2′-[2H]-naphtho[1,2-b]pyran]
spiro[4H-1-benzopyran-4,3′-[3H]naphtho[2,1-b]pyran]
spiro[2H-naphtho[1,2-b]pyran-2,3′-[3H]-naphtho[2,1-b]pyran]
spiro[indoline-2,2′-pyrano[3,2-H]quinoline]
spiro[2H-1-benzopyran-2,2′-[2H]quinoline]

Other classes of photochromic dyes include: triarylmethane dyes, cationic polymethane dyes, indenone oxides, nitrones, bis-imidizoles, hexaarylethanes, b-tetrachloroketodihydronaphthalenes, hydrazines, nitrosodimers, aryl disulfides, stilbenes, indigoids, azo compounds, polyenes, cyanine dyes, unsaturated azines, p-phenyl ketones, nitro pyridenes, nitrophenyl methanes, p-nitrobenzyl compounds, dihydroxanthenones, bianthrones, trans-15,16-dialkyldihydropyrenes, 2H-pyrans, 2H-thiopyrans, and cis-1-aryl-2-nitroalkenes.

The spirooxazines are also useful as photochromic dyes in the invention. These photochromic dyes have the general formula:

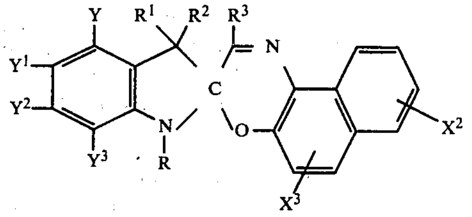

IV wherein R, $R^1$ and $R^2$ represent aryl radicals, the same or different alkyl radicals having 1 to 20 carbon atoms, inclusive, and $R^1$ and $R^2$ taken together form a saturated carbocyclic ring, $R^3$ is hydrogen or an alkyl radical having 1 to 20 carbon atoms, inclusive, X, $X^1$, $X^2$, $X^3$, Y, $Y^1$, $Y^2$ and $Y^3$ represent hydrogen, an aryl radical, a cyano or carboxy cyano radical, an alkoxy radical having 1 to 4 carbon atoms inclusive, an alkyl or carboxy alkyl radical having 1 to 20 carbon atoms, a nitro radical or a halogen radical.

Methods for the preparation of these compounds can be found for example in U.S. Pat. Nos. 3,562,172 and 3,578,602, the disclosures of which are hereby incorporated by reference. Useful spirooxazines are:

1,3,3-trimethylspiro[indolino-2,3′-naphtho[2,1-b](1,4)-oxazine]
1,3,3,5-tetramethylspiro[indolino-2,3′-naphtho[2,1-b](1,4)-oxazine]
5-methoxy-1,3,3-trimethylspiro[indolino-2,3′-naphtho[2,1](1,4)-oxazine]
1-β-carboxyethyl-3,3-dimethylspiro[indolino-2,3′-naphtho[2,1-b](1,4) oxazine]
1-β-carboxyethyl-3,3,5-trimethyl spiro[indolino-2,3′-naphtho[2,1-b](1,4) oxazine]
1-carboxyethyl-3,3-dimethyl-5-methoxy spiro[indolino-2,3′-naphtho[2,1-b](1,4) oxane]
1-α-cyanopropyl-3,3-dimethyl-5-chlor-spiro[indolino-2,3′-naphtho[2,1-b](1,4) oxazine]

In addition to the photochromic materials above described, the process of the invention is applicable to other photochromic materials which are capable of being coated with a protective inorganic material for instance by the procedures described below. For instance, phenazine and phenothiazine dyes are well known to exhibit photosensitivity and can be suitably coated using the methods described below. The phenazine photochromic dyes have the general formula:

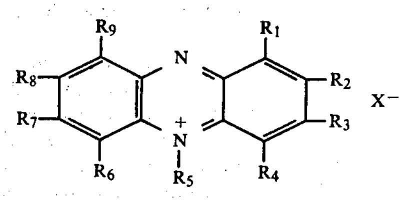

the $X^-$ represents the negative ion, e.g. halides; $R_1$, $R_2$, $R_3$, $R_4$, $R_5$, $R_6$, $R_7$, $R_8$ and $R_9$ may be hydrogen; short chain alkyl; amino, alkyl amino; azo; substitute a azo; usually aryl substituents; etc. The substituents on the phenazinium ion may be 1, 2 or more providing different colors. The $R_5$ substituent is usually aryl, but may be hydrogen, etc. When $R_5$ is phenyl, the class of dyes is known as phenylphenazinium salts, or safranine dyes.

Methods for their preparation as well as optical and ophthalmic applications for such photochromic materials are described in U.S. Pat. No. 3,660,299, the disclosure of which is hereby incorporated by reference. Useful phenazines are:

3-amino-7-dimethylamino-5-phenylphenazinium chloride
2-methyl-3-amino-7-dimethylamino-5-phenylphenazinium chloride
3,7-diamino-5-phenylphenazinium chloride
3-amino-2,8-dimethyl-7-(2-hydroxy-1-naphthylazo)-5-phenylphenazinium chloride
3-amino-7-(p-dimethylaminopenylazo)-5-phenylphenazinium chloride
3-diethylamino-7-(p-dimethylaminophenylazo)-5-phenylphenazinium chloride
3-diethylamino-7-(p-hydroxyphenylazo)-5-phenylphenazinium chloride
3,9-dimethylamino-6-methyl-5-(2-naphthyl)-phenazinium chloride
3,7-bis(dimethylamino)-5-phenylphenazinium chloride
2,8-dimethyl-3-amino-7-methylamino-5-phenylphenazinium chloride
3-amino-7-dimethylaminophenazinium chloride
1,3-diamino-5-phenylphenazinium chloride The phenothiazine dyes have the general formula: (The substituents are as defined above.)

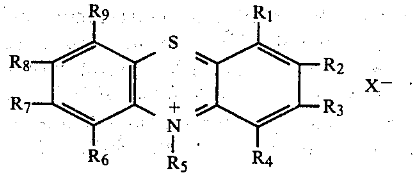

Examples of phenothiazine dyes with color index number where assigned are: Azure A (52005), Azure B (52010), Azure C (3-amino-7-methylamino-phenothiazine), toluidine Blue O (52040), Methylene Blue (52015) and Thionine (52000).

The processes utilized for encapsulating the photochromic materials of the invention with an inorganic protective material such as silicon dioxide, titanium dioxide, aluminum oxide ($Al_2O_3$) antimony oxide and zinc oxide include the following:

A photochromic dye is combined with a resinous material by an imbibition process wherein a photochromic dye is obtained in a resinous material upon treatment of a resinous material with a solution of photochromic dye. Preferably, the resinous material is in a finely divided form prior to treatment with the solution of photochromic dye.

(1) A titanium salt such as titanium chloride or other inorganic material is precipitated onto the surface of the photochromic material particle obtained as previously described. A particle within the range of about 30 Å to about 1μ is obtained. Precipitation can take place in an aqueous medium in which the photochromic material particle is dispersed and the titanium salt is dissolved. Subsequently, the titanium salt or other coating material is precipitated onto the photochromic particle material by evaporation of solvent or by reducing the solubility by temperature change or by chemical methods such as addition of a base or other anion that would cause precipitation of titanium salt. The coated particles are isolated and the titanium salt is changed to an oxide, if required, by the application of heat. Precipitation of such materials as titanium dioxide onto the surface of pigment particles is well-known in the art of preparing pigments for use in paint and other coatings. For instance, a titanium-calcium pigment is produced by precipitating titanium dioxide on the surface of calcium sulfate particles to produce a pigment having 30% to 50% titanium dioxide content. The titanium-calcium pigment, when so protected by a titanium dioxide surface coating, permits the use of calcium sulfate in water base paints which would not be possible otherwise since because of the partial solubility of calcium sulfate in water, the calcium ions present can react with materials present in water base paint such as proteinaceous materials as exemplified by casein. In a similar manner, therefore, it is possible to protect the photochromic dye imbibed in a resinous material by a coating, for instance, of titanium dioxide and thereby prevent the adverse effect of oxygen or water vapor or other deleterious chemicals on the photochromic materials when subsequently dispersed within a plastic material and utilized in an ophthalmic or optical device.

(2) As a second means of providing an inorganic material coating on a photochromic material particle, the photochromic dye imbibed in a resinous material which has been first produced in a finely divided form by methods known in the art of producing pigment materials such as by use of an attrition mill, a colloid mill, fluid energy mill, etc. to produce particles ranging in size between about 30 Å to about 1μ. Such particles are then added to a solution of the inorganic material, for instance, titanium dioxide is soluble in hot concentrated sulfuric acid as $TiOSO_4$. The inorganic material is then precipitated from the solution as, for example, by adjustment of pH and hydrolysis to form $TiO_2$ from $TiOSO_4$. The coating process should be effected as rapidly as possible to avoid decomposition of the photochromic material particle as by hydrolysis.

(3) The photochromic dye imbibed in a resinous material can be provided with a protective inorganic layer by suspension in an aqueous solution of hydrolyzed tetra-ethylorthosilicate. Upon evaporation of the water, and subsequent heating of the remaining particles, individually coated particles are obtained with a transparent layer of silicon dioxide.

(4) As a fourth method of obtaining an encapsulated photochromic material particle, vapor phase coating techniques such as chemical vapor deposition are useful. Metallic compounds can be subjected to cathodic sputtering in an atmosphere of reactive gas. For instance, oxide films can be produced by cathodic sputtering of a metal in an oxygen atmosphere, sulfide films by cathodic sputtering in hydrogen sulfide, nitride films by sputtering in nitrogen etc. The molecules of the reactive gas are activated in such process in the electric discharge so that chemical reaction can take place with the metal to produce the film of metallic compound. It should be noted that the use of the term "metal" used to refer to the inorganic material protective coating includes metalloids such as silicon, germanium, boron and phosphorous which, although in the true sense are nonmetals, do in many ways act and react like metals and are useful in forming a protective coating for the photochromic material. By such a process, silicon dioxide, titanium dioxide, aluminum oxide, antimony oxide and zinc oxide films can be produced on the surface of photochromic material particles. Alternatively, the coating compounds can be vacuum evaporated or non-reactively sputtered or deposited by chemical vapor deposition techniques.

During the coating process, the photochromic material particle is kept in a state of suitable agitation for example by mechanical means so as to provide a substantially even coating on the surface of the photochromic particle.

The photochromic material coated with an inorganic material can be dispersed in a plastic host by various methods depending upon the material utilized as the host. For instance, where an allyl diglycol carbonate, for instance, the material sold under the trademark "CR 39" is utilized, the particles are dispersed in the monomer in combination with a suitable amount of catalyst and the mixture cast in a lens-shaped mold according to conventional techniques as disclosed in U.S. Pat. Nos. 3,278,654; 3,469,928; 3,211,811; 2,964,501; and 3,605,195; the collective disclosures of which patents are hereby incorporated by reference. Particles can be dispersed in other monomers before polymerization.

The coated photochromic materials also can be incorporated in thermoplastic resins exemplified by such resins as polymethylmethacrylate, cellulose acetate butyrate, cellulose triacetate and polycarbonates such as those sold under the trademark "Lexan", a poly(4,4'-dioxydiphenol-2,2-propane) carbonate. The encapsulated photochromic material particles are mixed, for instance, with a powdered form of polycarbonate resin and the mixture subsequently injection molded to produce an ophthalmiclens or optical device. Films can be prepared by casting from solution a mixture of the encapsulated photochromic material particles and a solution of a thermoplastic resin in a suitable solvent, for example, polymethylmethacrylate dissolved in toluene.

The proportion of encapsulated photochromic material of the invention utilized in combination with a plastic host material in the preparation of ophthalmic or optical devices is between about 0.01 to about 80 weight percent and depends necessarily upon the photochromic properties of the encapsulated photochromic material particle selected and the desired optical density required. Lenses and optical devices prepared according to the foregoing lens casting procedures can be ground, polished and glazed in conventional manner using conventional techniques without affecting adversely the photochromic reactivity of the encapsulated photochromic material particle dispersed therein.

As will be apparent, the encapsulation of the photochromic material particles can be less than 100% complete and yet provide substantial improvement over the unencapsulated photochromic material when incorporated in a plastic host material. The important criterion is that, as a whole, the particles of the photochromic material are coated to render them sufficiently resistant to the effects of oxygen, moisture or the effects of catalysts, or other chemical ingredients in the composition that would inhibit the functioning of the photochromic material, for instance, when the coated photochromic material particles are incorporated into a plastic host. The novel photochromic material particles coated with an inorganic protective material can be used to produce ophthalmic and optical devices including such articles as plastic window panes, sky lights, automobile windshields, camera filters, wall panels, jewelry, toys, advertising articles and the like.

It will be recognized by those skilled in the art that the particle size distribution of the coated photochromic material particles utilized in a transparent article such as a lens is relatively narrow and small in size as compared to the particle size distribution of coated particles utilized in a translucent or reflective article such as a wall panel.

The following examples are set forth for purposes of illustration only and are not to be construed as limitations of the instant invention except as set forth in the appended claims. All parts and percentages are by weight and all temperatures are in degrees centigrade unless otherwise specified.

EXAMPLE 1

Photochromic particles of the appropriate dimensions are prepared by dissolving 10 grams of cellulose acetate butyrate, 1 gram of dimethyl phthalate, 2 grams of the ultraviolet absorber, 2,2'-dihydroxy-4-methoxybenzophenone. The solution is then sprayed under pressure through a fine nozzle into a collection chamber provided with filtered inlet and outlet tubes for the introduction of a stream of clean air to facilitate the evaporation of the solvent. The particles are immersed in a saturated solution of phenylmercuric chloride in diethylene glycol at 80° C. for 15 minutes. After removal from the immersion bath they are rinsed with cold ethyl alcohol and air dried.

Approximately 13 grams of the extremely fine plastic particles are collected from the evaporation chamber and suspended in 500 ml of an aqueous solution containing 30 grams of titanyl sulfate. To this aqueous suspension are then added 100 ml of a 20% solution of sodium hydroxide. Titanium hydroxide which first forms coats the particles and later becomes titanium dioxide according to the following reaction after separation of the suspension:

$$2Ti(OH)_3 \rightarrow 2TiO_2 + 2H_2O + H_2$$

The particles prepared in the above manner in the amount of 0.5 gram are dispersed in 95 grams of allyl diglycol carbonate prepolymer containing 5 grams of iso-propyl peroxide. The prepolymer mixture is then injected into glass lens forming molds. After polymerization and curing in a conventional manner, the plastic lenses are removed from the mold. The lenses thus formed are light amber in color and turn a dark gray in bright sunlight. The lenses will recover to their normal unactivated color in 10–30 minutes when brought indoors.

EXAMPLE 2

10 Grams of extremely fine cellulose powder, obtained commercially are fed into a colloid mill (such as the type manufactured by Premier Mill Corporation) to produce the cellulose acetate particles of the proper dimensions. The cellulose acetate particles so obtained are immersed in a 15% percent by weight solution of the photochromic dye, spiro [indoline-2,3-[3,4]-naphtho[2,1-b]-1,4-oxazine in triethylene glycol at 85° C. for 20 minutes. The particles are then separated, rinsed with cold ethyl alcohol and air dried.

The small plastic particles so formed are suspended in 100 ml of a 3% aqueous solution of tetra-ethylorthosilicate and 4 grams of concentrated sulfuric acid added.

Satisfactory suspension of the plastic particles occurs by rapid stirring with a magnetic stirrer. The solvent is driven off slowly by gentle heating and the particles collected are subsequently heated to produce photochromic plastic particles individually coated with a thin transparent layer of silicon dioxide. 0.7 Grams of the coated particles are suspended in 100 grams of methyl methacrylate monomer containing 0.5% by weight of benzoyl peroxide. The prepolymer mix containing the coated suspended particles is cast in rectangular glass molds which after polymerization yield flat photochromic plates. These plates are approximately $\frac{1}{8}$ inches thick. They are essentially colorless and turn a light blue shade when exposed to bright sunlight. In the absence of sunlight, the plates are found to recover their original colorless state in approximately one minute at room temperature.

EXAMPLE 3

One liter of ethyl alcohol is added rapidly to 100 grams of a 20% (by weight) solution of polymethylmethacrylate in methylene chloride. This results in the formation of fine plastic particles which are immediately separated and dried in an air circulating oven at 50° C. The fine plastic particles obtained result from the large scale nucleation of many small individual particles upon the rapid addition of a solvent, i.e. ethyl alcohol, in this instance, which is non-solvent for the methacrylate polymer.

The plastic particles are then immersed in a 10% (by weight) solution of 6-nitro-8-methoxy-1′,3′,3′-trimethylspiro [2H-1-benzo-2,2′-indoline]in dipropylene glycol at 90° C. for 30 minutes. The particles now exhibiting the photochromic effect are separated, rinsed with cold ethyl alcohol and air dried.

The resulting plastic photochromic particles are provided with a transparent protective coating by sputtering with aluminum in an oxygen atmosphere. Thus, the small plastic photochromic particles are provided with a coating of $Al_2O_3$.

0.7 Grams of the coated particles are intimately mixed with 90.0 grams of cellulose acetate butyrate and 100 grams of dioctyl phthalate. Using the above coated particles, injection molded plano lenses are prepared with a 2 mm thickness and a 6-base curve. The lenses are colorless before activation but turn a dark blue color after exposure to bright sunlight for two to three minutes. In the absence of bright sunlight, the lenses recover completely to their essentially colorless state in approximately 30 minutes.

EXAMPLE 4

20 Grams of the phenothiazine dye, methylene blue, are first dissolved in 2 liters of methyl alcohol. To this dark blue solution are then added 25 grams of anhydrous stannous chloride and the solution is stirred at 20° C. until all of the original blue color of the dye disappears (approximately 30 minutes) indicating reduction of the oxidized forms of the dye to the leuco form as is shown in the reaction below:

Oxidized Form Reduced (colorless) Form

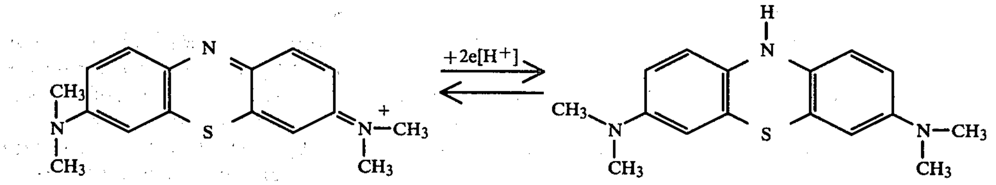

The resulting deep brown colored solution is treated several times with decolorizing charcoal. The solution is heated to its boiling point and 200 grams of very fine particles of vinyl chloride, obtained by processing in a colloid mill, are suspended in the boiling solution for 20 minutes. The particles are then separated, rinsed with cold ethyl alcohol and air dried.

The small photochromic particles are then coated with a protective layer of $TiO_2$ by the method described in Example 1.

0.2 Grams of the coated photochromic particles described above are suspended in 100 grams of a 20% solution of polymethylmethacrylate in toluene and a film cast on a 3 mil thick Mylar support. After evaporation of the solvent, a photochromic film is obtained which is essentially colorless but which is changed rapidly to dark blue coloration when exposed to an ultraviolet lamp or sunlight. In the absence of activating energy, the film returns to its original colorless state in approximately one hour at 70° F.

Various additional changes and modifications from the embodiments herein shown can be made by those skilled in the art without departing from the invention. Therefore, it is intended that the invention not be limited thereby.

We claim:

1. A stabilized photochromic particle for incorporation into a plastic host to impart photochromic properties thereto, said particle comprising:

an organic photochromic dye imbibed in a resinous material, said imbibed resinous material having a diameter in the range of 30 Å to 1μ; and, a protective coating on substantially the entire surface of said imbibed resinous material, said protective coating being effective to render the resulting photochromic particle impervious to the effects of oxygen, moisture, monomers, catalysts, and other chemicals used in the formation of plastic hosts which are deleterious to the photochromic particles.

2. The photochromic particle as set forth in claim 1 wherein said imbibed resinous material is coated with an inorganic oxide protective coating and wherein said resinous material is a material selected from the group consisting of vinyl type thermoplastics, cellulosics, polyesters, epoxy resins, and aminoplast resins.

3. The photochromic particle as set forth in claim 2 wherein said imbibed resinous material is coated with an inorganic oxide selected from the group consisting of silicon dioxide, titanium dioxide, aluminum oxide, antimony oxide, zinc oxide, inorganic glass, and mixtures thereof.

4. A photochromic particle as set forth in claim 3 wherein said dye is selected from the group consisting of spiropyrans, spirooxazines, metal dithizonates, phenothiazine dyes, phenazine dyes, triarylmethane dyes, cationic polymethane dyes, indenone oxides, nitrones, bis-imidizoles, hexaarylethanes, b-tetrachloroketodihydronaphthalenes, hydrazines, nitroso-dimers, aryl disulfides, stilbenes, indigoids, azo compounds, polyenes, cyanine dyes, unsaturated azines, p-phenyl ketones, nitro pyridenes, nitrophenyl methanes, p-nitrobenzyl compounds, dihydroxanthenones, bianthrones, trans-15, 16-dialkyl-dihydropyrenes, 2H-pyrans, 2H-thiopyrans, and cis-1-aryl-2-nitro-alkenes.

5. An ophthalmic material having photochromic properties comprising:

a plastic host material having a plurality of photochromic particles incorporated therein, each of said photochromic particles comprising:

an organic photochromic dye imbibed in a resinous material, said imbibed resinous material having a diameter in the range of 30 Angstroms to 1$\mu$; and, a protective coating on substantially the entire surface of said imbibed resinous material, said coating being effective to render the photochromic particle impervious to the effects of oxygen, moisture, monomers, catalysts, and other chemicals used in the formation of plastic hosts which are deleterious to the photochromic particle.

6. The material as set forth in claim 5 wherein said plastic host material is selected from the group consisting of poly (allyl diglycol carbonate), polycarbonate, polymethylmethacrylate, cellulose acetate butyrate and cellulose triacetate and wherein said protective coating is formed of a member selected from the group consisting of titanium dioxide, silicon dioxide, aluminum oxide, antimony oxide, zinc oxide, inorganic glass, and mixtures thereof and wherein said plastic host material contains photochromic particles in a range of 0.01 to 80 weight percent of the host material.

7. A process for producing a stabilized photochromic particle suitable for incorporation into a plastic host for imparting photochromic properties to said host comprising:

(1) imbibing a photochromic dye in a resinous material to produce imbibed resinous particles having diameters in the range of 30 Angstroms to 1$\mu$; and, (2) depositing a protective coating on said imbibed particle, the thickness of the protective coating being effective to produce a photochromic particle which is impervious to the effects of oxygen, moisture, monomers, catalysts, and other chemicals used in the formation of plastic hosts which are deleterious to the photochromic particles.

8. The process as set forth in claim 7 wherein said protective coating is deposited on said imbibed resinous particle by cathodic sputtering with a metal.

9. The process as set forth in claim 7 wherein said protective coating is deposited on said imbibed photochromic particle by vacuum deposition.

10. The process as set forth in claim 7 wherein said protective coating is deposited on said imbibed photochromic particle by chemical vapor deposition.

11. The process as set forth in claim 7 wherein said protective coating is deposited on said imbibed photochromic particle by precipitation of a soluble form of an inorganic coating on said particle and subsequent treatment to form an oxide.

12. The process as set forth in claim 7 wherein the photochromic dye, phenyl mercuric dithizonate, is imbibed into cellulose acetate butyrate and a protective coating of silicon dioxide is deposited on said photochromic dye.

* * * * *